H. N. DALTON.
Grain-Drill.
No. 2,068, 33,072.
Patented Aug. 20, 1861.
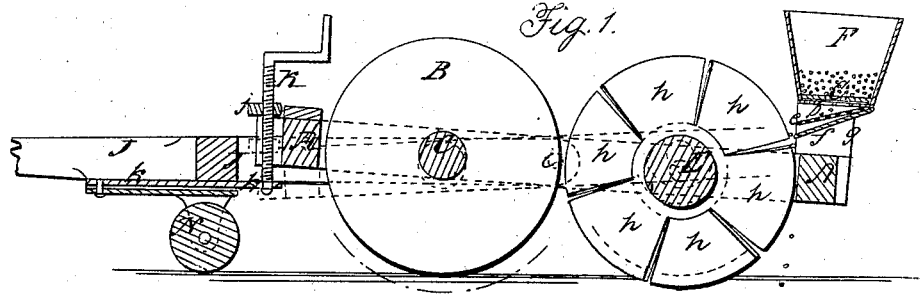
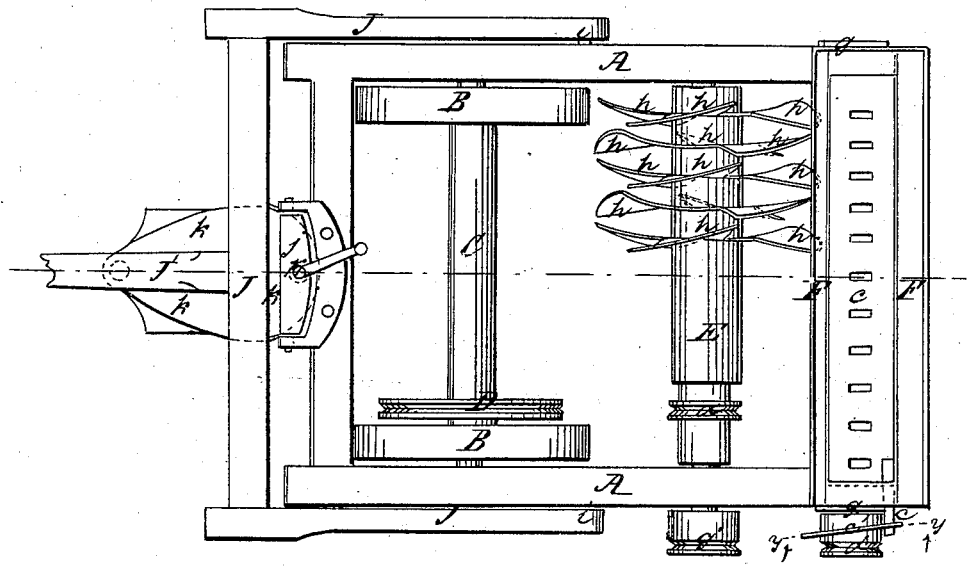
Witnesses:
Inventor.

UNITED STATES PATENT OFFICE.

H. N. DALTON, OF JACKSONVILLE, CALIFORNIA.

IMPROVEMENT IN SEEDING-MACHINES.

Specification forming part of Letters Patent No. 33,072, dated August 20, 1861.

*To all whom it may concern:*

Be it known that I, H. N. DALTON, of Jacksonville, in the county of Tuolumne and State of California, have invented a new and Improved Seeding-Machine; and I do hereby declare that the following is a full, clear, and exact description thereof, reference being had to the accompanying drawings, making a part of this specification, in which—

Figure 1 is a longitudinal section through the improved seeding-machine, taken in the vertical plane indicated by red line $x\ x$ in Fig. 2. Fig. 2 is a top view of the complete machine. Fig. 3 is a transverse section through the cam-drum and end of seed-slide, as indicated by the red line $y\ y$, Fig. 2.

Similar letters of reference indicate corresponding parts in the three figures.

To enable those skilled in the art to make and use my invention, I will proceed to describe its construction and operation.

A represents a quadrangular frame, which is mounted on the wheels B B of a transverse axle, C. Wheels B B are in advance of the middle of the frame A, so as to leave a space behind them for the plows. The axle C has a large pulley-wheel, D, keyed to it between the two wheels B B, and this pulley D communicates a rotary motion to the transverse plow-shaft E through a belt which passes over the pulley D and also over pulley $a$.

On the rear end of frame A, and extending transversely across this frame, is the hopper F, which has a perforated bottom, $d$, and a perforated seed-slide, $c$, arranged on the bottom $b$ and operated with a reciprocating motion by a cam-plate, C′, which is secured around the pulley-drum $d$.

Below the perforated bottom $b$ of the hopper F a wire-gauze shelf, $e$, is arranged in an inclined position, inclining forward from the back of the hopper, so as to discharge the seed falling on it from the hopper in front of this hopper. Below this screen a shelf, $f$, is arranged, which also inclines forward like screen $e;$ but this latter shelf, which is not perforated, has a greater inclination than the former shelf, $e$. The hopper F is mounted on posts $g\ g$, which are secured to each side of the frame A and to each end of the hopper F. The seed-slide $c$ receives its motion through cam-plate $c'$, pulley-drum $d$, and a belt which communicates with a pulley, $g'$, on one end of plow-shaft E. The plow-shaft E has its bearings in each side of frame A, and is parallel with the hopper F, and also with the axle C. On this shaft E a series of segmental steel plates, $h\ h\ h\ h$, are arranged, the outer edges of which are concentric with the axis of the shaft to which they are secured, and their length is the same from end to end of the shaft E. These segmental plates $h\ h\ h\ h$ are so arranged on their shaft that the plates of one series will be opposite the plates of the next series, as is shown in Figs. 1 and 2 of the drawings. These plates $h\ h\ h\ h$ are also bent in such a form that their outer edges form a nearly continuous spiral line from one end to the other of the series, thus giving to the plates a transverse spiral action upon the earth with which their circumferential edges come in contact. The forward radial or straight edges of the plates $h\ h\ h\ h$ should be kept sharp, so as to cut through the sods readily, and if desirable all the edges of these plates may be sharpened. These plates receive a rapid rotary motion from the axle $c$, as before described, and they slice and pulverize the soil, and stir the seed into it as the seed falls from the shelves under the hopper F and between these rotating blades $h\ h\ h\ h$.

J J are the hounds of draft-pole J′. These hounds J J are carried along on each side of frame A, and pivoted at $i\ i$ to the longitudinal bars of the frame A. The transverse bar of hounds J J is connected to the front end of frame A by a perpendicular adjusting-screw, K, which passes through a rocking nut, $j$, and is fastened at its lower end to the back edge of a plate, $k$, which is securely bolted to the bottom of the cross-bar of the hounds.

Underneath of plate $k$ is pivoted a caster-wheel, N, which serves as the guide-wheel.

The hounds are pivoted to the frame A behind the axle C, as before shown, and it will be seen that on turning the screw K in one direction the rear end of frame A may be depressed and the plows adjusted to run any desirable depth in the ground, and on turning this screw K in the opposite direction the plows may be raised entirely from the ground, if desirable.

I am aware that it is not new to arrange under the bottom of seed-hoppers which scatter broadcast an inclined board or shelf, and this I do not claim broadly. Nor do I desire to claim rotating plates for stirring the soil, except when they are constructed and arranged in the manner herein shown.

I am also aware that various means have been essayed for raising and depressing the front ends of the frames of seeding-machines.

Having thus described my invention, what I claim as new, and desire to secure by Letters Patent, is—

The hounds J J, pivoted at $i$ $i$ to frame A, and mounted on the caster-wheel N, in combination with the bearing-plate $k$, adjusting-screw K, and rocking nut $j$, all arranged in the manner and operating as herein described.

H. N. DALTON.

Witnesses:
E. H. THOMAS,
P. A. J. BEARD.